(12) United States Patent
Enokido et al.

(10) Patent No.: US 7,477,819 B2
(45) Date of Patent: *Jan. 13, 2009

(54) TWO-DIMENSIONAL PHOTONIC CRYSTAL

(75) Inventors: Yasushi Enokido, Tokyo (JP); Isao Nakahata, Tokyo (JP)

(73) Assignee: TDK Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 10/530,220

(22) PCT Filed: Jan. 9, 2004

(86) PCT No.: PCT/JP2004/000107

§ 371 (c)(1),
(2), (4) Date: Oct. 24, 2005

(87) PCT Pub. No.: WO2004/068195

PCT Pub. Date: Aug. 12, 2004

(65) Prior Publication Data

US 2006/0124047 A1  Jun. 15, 2006

(30) Foreign Application Priority Data

Jan. 31, 2003  (JP)  ............................... 2003-024936

(51) Int. Cl.
*G02B 6/02* (2006.01)
*G02B 6/10* (2006.01)

(52) U.S. Cl. ................... 385/123; 385/125; 385/129; 385/130; 385/131; 385/132

(58) Field of Classification Search ................. 385/123, 385/125, 129–132
See application file for complete search history.

(56) References Cited

U.S. PATENT DOCUMENTS 5,739,796 A  *  4/1998  Jasper et al. ................. 343/895

(Continued)

FOREIGN PATENT DOCUMENTS

EP  1 219 984  5/2004

(Continued)

OTHER PUBLICATIONS

Rongzhou Wang et al. "Effects of Shapes and Orientations of Scatterers and Lattice Symmetries on the Photonic Band Gap in Two-Dimensional Photonic Crystals" Journal of Applied Physics, vol. 90 No. 9, pp. 4307-4313, Nov. 1, 2001.

(Continued)

*Primary Examiner*—Robert M Kunemund
*Assistant Examiner*—G. Nagesh Rao
(74) *Attorney, Agent, or Firm*—Hogan & Hartson LLP

(57) ABSTRACT

A two-dimensional photonic crystal, wherein on a plane in which four adjoining unit lattices L are arranged so as to have one angle in common with the unit lattice L being a rectangle whose shorter side X1 has a length of x1 and whose longer side Y1 has a length of y1, columnar first dielectric regions each having a rectangular cross section whose shorter side X2 has a length of x2 and whose longer side Y2 has a length of y2 are arranged on shorter sides X1 and longer sides Y1 of each rectangular unit lattice L. In this two-dimensional photonic crystal, the first dielectric region is arranged so that the midpoint of the shorter side X1 and the midpoint of the longer side Y1 and the center of the rectangular cross section substantially coincide, and longer sides Y2 of each first dielectric region are substantially parallel to each other.

19 Claims, 8 Drawing Sheets

U.S. PATENT DOCUMENTS

| | | | |
|---|---|---|---|
| 5,784,400 A | 7/1998 | Joannopoulos et al. | |
| 6,366,392 B1 * | 4/2002 | Tokushima | 359/321 |
| 6,560,006 B2 * | 5/2003 | Sigalas et al. | 359/321 |
| 6,728,457 B2 * | 4/2004 | Sigalas et al. | 385/125 |
| 6,738,551 B2 * | 5/2004 | Noda et al. | 385/130 |
| 6,898,362 B2 * | 5/2005 | Forbes et al. | 385/132 |
| 6,996,319 B2 * | 2/2006 | Noda et al. | 385/129 |
| 7,120,344 B2 * | 10/2006 | Noda et al. | 385/129 |
| 7,136,561 B2 * | 11/2006 | Enokido | 385/129 |
| 7,155,087 B2 * | 12/2006 | Suh et al. | 385/27 |
| 7,158,710 B1 * | 1/2007 | Zhou | 385/129 |
| 7,184,642 B2 * | 2/2007 | Hoshi et al. | 385/129 |
| 7,224,862 B2 * | 5/2007 | Noda et al. | 385/24 |
| 2002/0146196 A1 | 10/2002 | Shirane et al. | |

FOREIGN PATENT DOCUMENTS

| | | |
|---|---|---|
| JP | 2001-072414 | 3/2001 |
| JP | 2001-272555 | 10/2001 |
| JP | 2002-162525 | 6/2002 |

OTHER PUBLICATIONS

Kee et al. "Absolute photonic band gap in a two-dimensional square lattice of square dielectric rods in air" Physical Review E Statistical Physics, Plasmas, Fluids and Related Interdisciplinary Topics, The American Physical Society vol. 56, No. 6, pp. R6291-R6293, Dec. 1997.

* cited by examiner

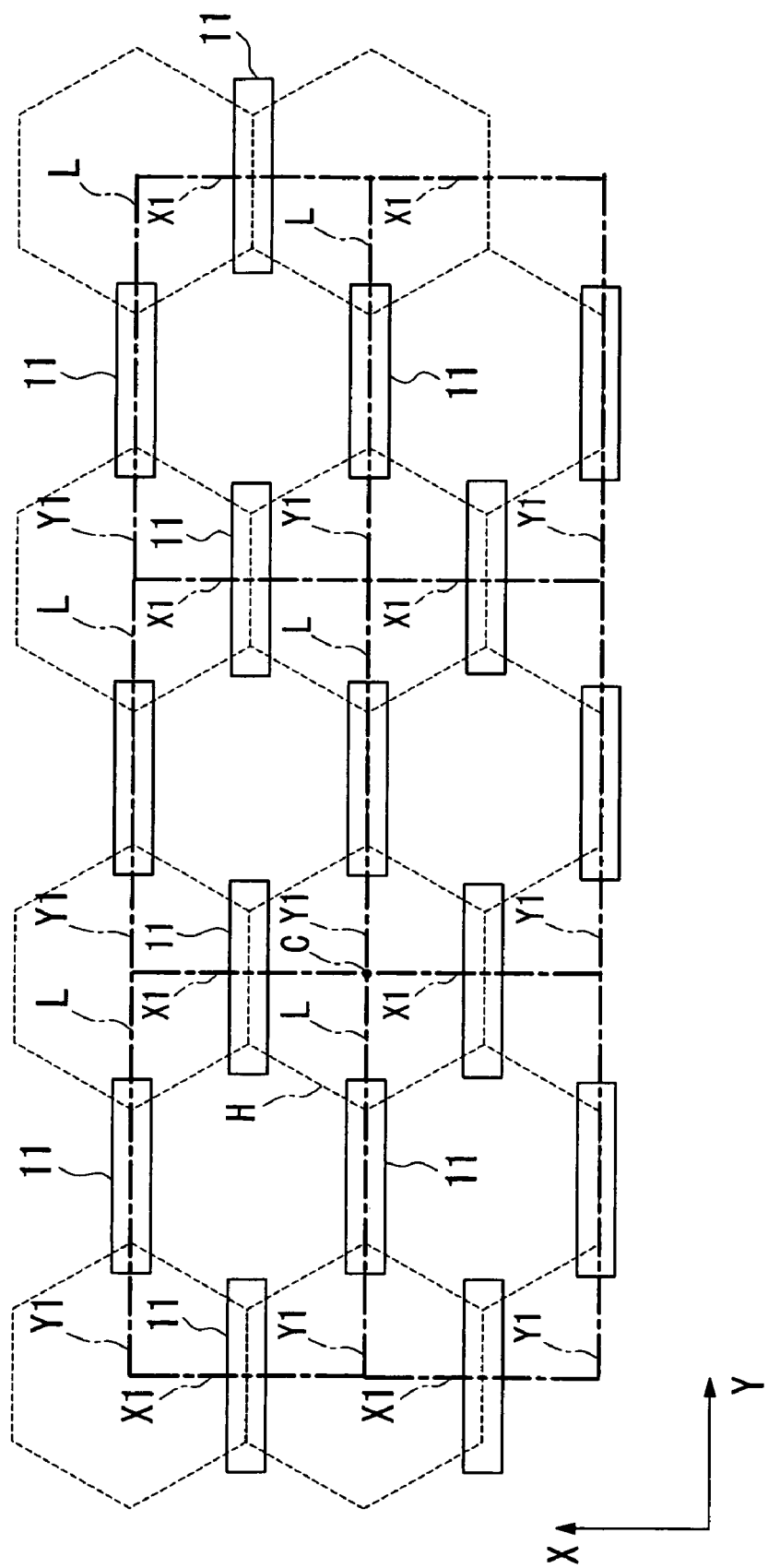

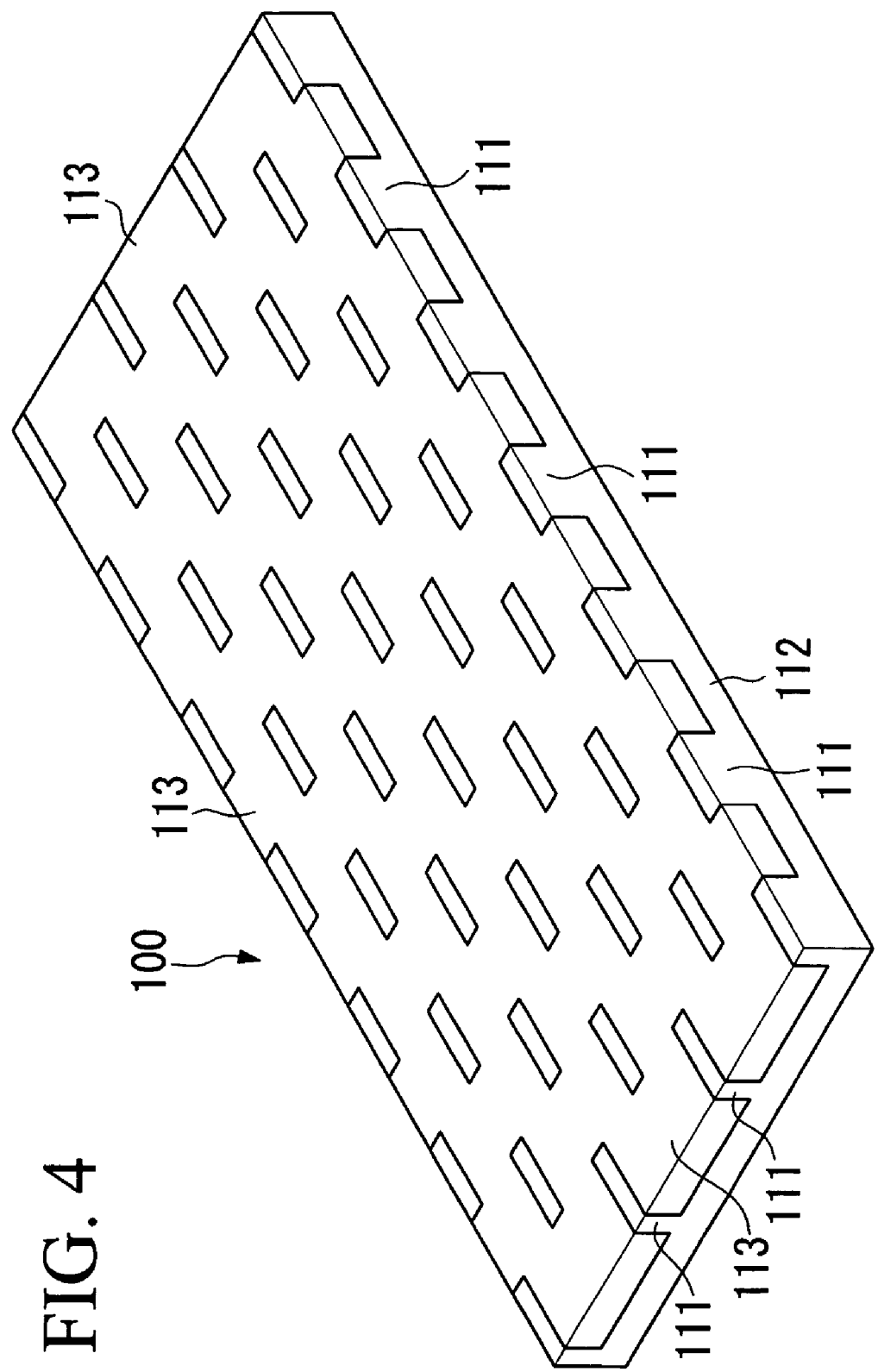

TWO-DIMENSIONAL PHOTONIC CRYSTAL

TECHNICAL FIELD

The present invention relates to a two-dimensional photonic crystal.

BACKGROUND ART

In recent years, attention has been given to a photonic crystal which is a two-dimensional or three-dimensional structure whose dielectric constant is periodically changed. Here, the two-dimension or three-dimension is determined based on the number of directions having periodicity. If an electromagnetic wave enters a photonic crystal composed of a periodic structure of two types of dielectric materials to cause Bragg diffraction, two standing waves are generated. They are a high energy standing wave generated in a low dielectric constant region and a low energy standing wave generated in a high dielectric constant region. Because a wave having energy between energies of these two standing waves cannot exist, a photonic band gap appears in the photonic crystal. An electromagnetic wave in the range of energy (wave length) in the photonic band gap cannot pass through the photonic crystal. The photonic band gap mentioned herein refers to the above phenomenon considered the same as that of a band gap (forbidden band) of the energy level of crystal electrons.

If a defect disturbing periodicity is introduced into a crystal having a photonic band gap, light can exist only in this defective portion. Thus, if the crystal is fabricated so as to have a region with the defect confined within the crystal, an optical resonator can be obtained. If the crystal is fabricated with the defect linearized within the crystal, a waveguide can be obtained. For example, in the case of a two-dimensional photonic crystal, an electric field component can be classified into a TE wave (transverse electric wave) parallel to a plane of the periodic structure and a TM wave (transverse magnetic wave) perpendicular to the plane of the periodic structure. In general, ranges of frequencies $\omega$ of photonic band gaps corresponding to respective lights do not necessarily coincide. Therefore, if a frequency range in which photonic band gaps occur concurrently for both the TE wave and the TM wave exists, the photonic band gap may be called a complete band gap.

A relatively simple structure photonic crystal of two-dimensional structure in which a complete band gap exists is known. The photonic crystal has through-holes (air holes) arranged on triangular lattices in a dielectric material as disclosed in, for example, Japanese Patent Laid-Open No. 2001-272555. In this case, the broadest complete band gap is obtained when the radius (r/a) is 0.48 and the frequency ($\omega a/2\pi c$) is about 0.5. A character r represents a radius of the hole, a represents a lattice constant, $\omega$ represents an angular frequency of light, and c represents a light velocity in vacuum.

In a conventional two-dimensional photonic crystal in which air holes are arranged in a triangular lattice form, the complete band gap is obtained when the diameter d of the hole (=2r) equals 0.95a. The thickness of a wall between holes at the thinnest portion is very small, that is 0.05a, i.e. 0.035 µm, and therefore it is difficult to fabricate a two-dimensional photonic crystal in which the complete band gap can be obtained.

The present invention has been made based on this technical problem, and its object is to provide a photonic crystal which is easily produced and has a two-dimensional periodic structure capable of having a complete band gap for the TE wave and the TM wave.

DISCLOSURE OF THE INVENTION

The present invention provides a two-dimensional photonic crystal, wherein on a plane in which four adjoining unit lattices are arranged so as to have one angle in common with the unit lattice being a rectangle whose shorter side X1 has a length of x1 and whose longer side Y1 has a length of y1, first dielectric regions each being columnar and having a rectangular cross section whose shorter side X2 has a length of x2 and whose longer side Y2 has a length of y2 are disposed on shorter sides X1 and longer sides Y1 of each rectangular unit lattice.

For the present invention, in the two-dimensional photonic crystal described above, the first dielectric region is disposed so that the midpoint of the shorter side X1 and the midpoint of the longer side Y1 and the center of the rectangular cross section substantially coincide, and longer sides Y2 of each first dielectric region are parallel to each other. Further, the ratio of x1:y1 equals 1:substantially $\sqrt{3}$ and the ratio of x1:x2: y2 equals 1:0.133:0.48 to 1:0.158:0.58.

In the two-dimensional photonic crystal of the present invention, the ratio of x1:x2:y2 preferably equals 1:0.135: 0.48 to 1:0.150:0.54, further preferably 1:0.135:0.52 to 1:0.140:0.54.

According to the present invention described above, the first dielectric region has a rectangular cross section having a size of about 0.10 µm×0.37 µm at the minimum, and therefore the two-dimensional photonic crystal of the present invention is much more excellent in productivity than a conventional two-dimensional photonic crystal having air holes arranged in a rectangular lattice form. Moreover, as described later, it has a sufficient complete band gap from a practical standpoint.

The two-dimensional photonic crystal of the present invention may comprise a second dielectric region surrounding the first dielectric region and having a dielectric constant different from that of the first dielectric region. The first dielectric region and the second dielectric region conceptually include not only a tangible material but also a gas. Thus, in the present invention, one of the first dielectric region and the second dielectric region may be formed from a dielectric material, and the other may be formed from a gas. A typical example of the gas is air. In the present invention, the dielectric material always refers to a tangible material.

For the dielectric material described above, for example, BaO—TiO$_2$ or BaO—Nd$_2$O$_3$—TiO$_2$ dielectric material may be used.

The first dielectric region and the second dielectric region may be formed from dielectric materials having different dielectric constants.

In this case, the first dielectric region and the second dielectric region may be fired bodies. Consequently, a two-dimensional photonic crystal of which the mechanical strength and dielectric constant are further improved can be obtained.

The two-dimensional photonic crystal according to the present invention may comprise a flat-plate shaped base, and a plurality of first dielectric regions formed from a dielectric material the same as that of the base and erected from the base. The second dielectric region may be a gas such as air, or may be a dielectric material.

The present invention provides a two-dimensional photonic crystal in which first dielectric regions, and second dielectric regions having a dielectric constant different from that of the first dielectric region are periodically disposed, characterized in that the two-dimensional photonic crystal comprises first dielectric regions each being columnar and having a rectangular cross section and second dielectric regions each surrounding the first dielectric region, a line segment Lx linking centers of two of the first dielectric regions adjoining in an X direction and a line segment Ly linking centers of two of the first dielectric regions adjoining in a Y direction orthogonal to the X direction are substantially orthogonal to each other substantially at their midpoints, the ratio between the length x3 of the line segment Lx and the length y3 of the line segment Ly equals 1:substantially $\sqrt{3}$, and the ratio between the length x3 of the line segment Lx and the length x2 of the first dielectric region in the X direction and the length y2 in the Y direction equals 1:0.133:0.48 to 1:0.158:0.58.

In the two-dimensional photonic crystal of the present invention, x3:x2:y2 preferably equals 1:0.135:0.48 to 1:0.150:0.54, further preferably 1:0.135:0.52 to 1:0.140:0.54.

In the two-dimensional photonic crystal according to the present invention, one of the first dielectric region and the second dielectric region may be formed from a dielectric material, and the other may be formed from a gas.

In the two-dimensional photonic crystal according to the present invention, the first dielectric region and the second dielectric region may be formed from dielectric materials having different dielectric constants.

The two-dimensional photonic crystal according to the present invention may have a full band gap width of 20.0% or greater. In the present invention, if full band gaps continuously exist for frequencies, the full band gap width (%) is a value obtained by dividing the width of the frequencies by the mean frequency.

BRIEF DESCRIPTION OF THE DRAWINGS

FIG. 2 is a view showing an arrangement of unit lattices and rectangular column structures of the photonic crystal according to the present invention;

FIG. 4 is a perspective view showing another example of the photonic crystal according to the present invention;

BEST MODE FOR CARRYING OUT THE INVENTION

Embodiments of the present invention will be described below.

Figure 1:
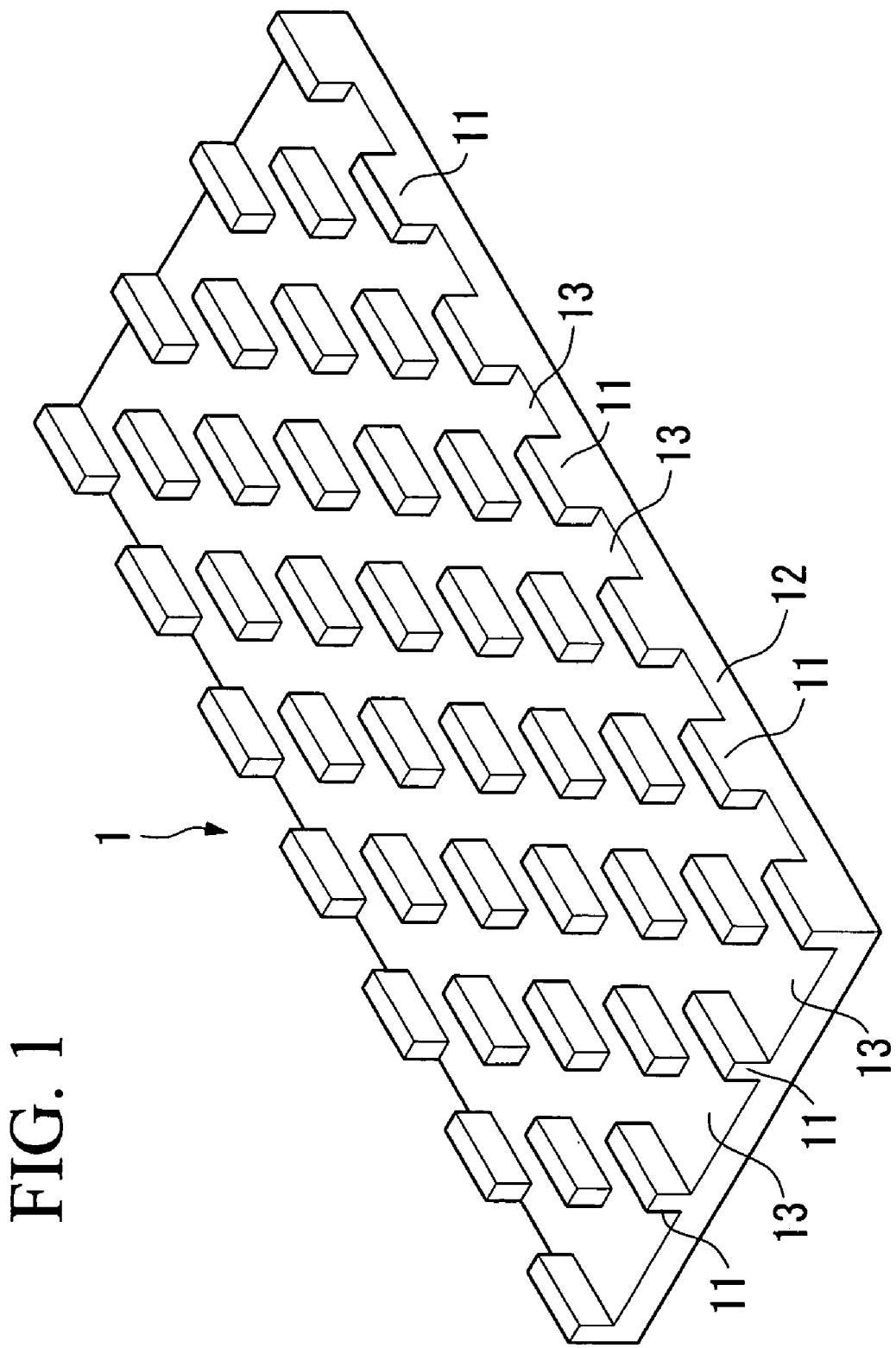
FIG. 1 is a perspective view showing one example of a photonic crystal according to the present invention.

FIG. 1 is a perspective view showing a structure of a photonic crystal 1 in this embodiment. In FIG. 1, the photonic crystal 1 according to this embodiment has a structure in which a plurality of rectangular column structures 11 are arranged on a base 12. The rectangular column structure 11 and the base 12 may be formed from dielectric materials such as, for example, $BaO$—$TiO_2$ based one and $BaO$—$Nd_2O_3$—$TiO_2$ based one. Dielectric materials constituting the rectangular column structure 11 and the base 12 may be the same, or may be different. There is an air gap 13 between adjoining rectangular column structures 11, and air exists in the air gap 13. Thus, the rectangular column structure 11 constitutes a first dielectric region, and the air gap 13 between adjoining rectangular column structures 11 constitutes the second dielectric region. Hence, the photonic crystal 1 has a two-dimensional periodic structure.

FIG. 2 is a view illustrating a disposition of rectangular column structures 11 constituting first dielectric regions in the photonic crystal 1, and a schematic diagram of the photonic crystal 1 viewed plain-wise.

Equilateral hexagons shown by dotted lines are virtually arranged in a honeycomb form on the photonic crystal 1 as shown in FIG. 2. Rectangular column structures 11 are erected on sides parallel to the Y direction of sides making up the equilateral hexagon, in the FIG. FIG. 2 shows only part of the photonic crystal 1, and also only part of the rectangular column structure 11.

A unit of a periodic structure of rectangular column structures 11 is constituted by four rectangular column structures surrounding a given equilateral hexagon H. The unit of the periodic structure is defined as a unit lattice L in the present invention. The unit lattice L is composed of two shorter sides X1 disposed parallel to an X direction and two longer sides Y1 disposed in a Y direction orthogonal to the X direction, and makes up a rectangle. Four adjoining unit lattices L have one angle C in common. The unit lattices L mentioned herein can cover a plane with neither overlap nor gapping by translational manipulation of the unit lattices L as a matter of course.

In the unit lattice L, rectangular column structures 11 are disposed on two shorter sides X1 disposed parallel to the X direction and two longer sides Y1 disposed parallel to the Y direction, respectively. The rectangular column structures 11 constitute the first dielectric region. Areas surrounding the rectangular column structures 11 constitute the second dielectric region. In FIG. 2, the first dielectric region constituted by rectangular column structures 11 is formed from a dielectric material and the second dielectric region surrounding the first dielectric region is air as a premise, but it is possible to make the area of the first dielectric region from air and make the second dielectric region surrounding the first dielectric region from a dielectric material. As shown in FIG. 4, a photonic crystal 100 according to the present invention may be fabricated from rectangular column structures 111 formed from a first dielectric material and a second dielectric region 113 surrounding the rectangular column structures 111, formed from a second dielectric material. The first dielectric material and the second dielectric material have different dielectric constants. A base 112 of the photonic crystal 100 is formed from the first dielectric material.

The photonic crystal 1 according to the present invention has a characteristic in the sizes of the unit lattice L and the rectangular column structure 11 disposed in the unit lattice L. The characteristic point will now be described based on FIG. 3.

Figure 3A:
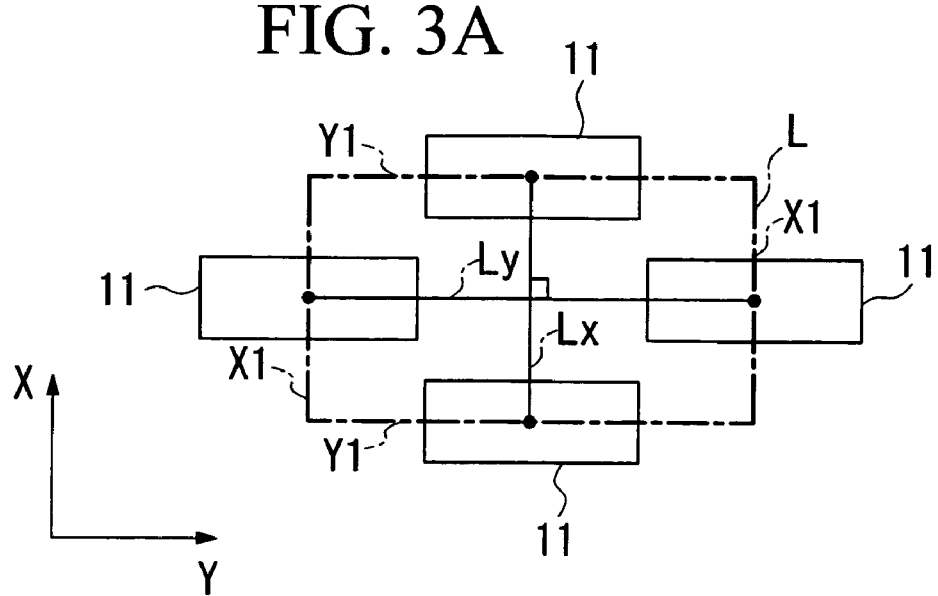
FIG. 3 is a view illustrating sizes of the unit lattice and the rectangular column structure in the photonic crystal according to the present invention.
Figure 3B:
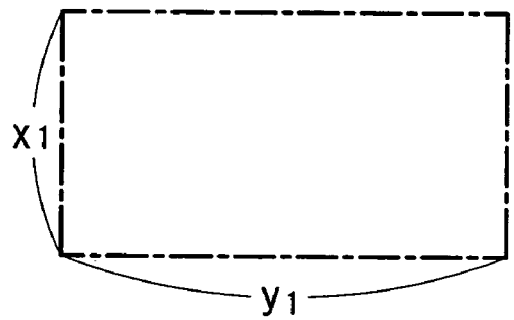
Figure 3C:
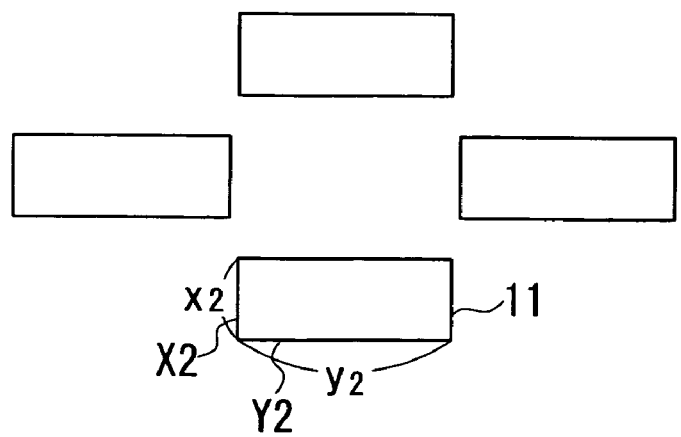

FIG. 3A shows the unit lattice L of the photonic crystal 1 according to this embodiment. FIG. 3B excludes the rectangular column structure 11 and shows only the unit lattice L, and FIG. 3C shows only the rectangular column structure 11.

In the photonic crystal 1 according to the present invention, the ratio between the length x1 of the shorter side X1 and the length y1 of the longer side Y1 of the unit lattice L shown in FIG. 3B is set to x1:y1=1:substantially $\sqrt{3}$. The ratio of x1:y1 is 1:$\sqrt{3}$ in the strict sense, but is set to 1:substantially $\sqrt{3}$ in consideration of errors. In the present invention, the same holds true for the term "substantially" used elsewhere. In the unit lattice L, shorter sides X1 are substantially parallel to each other and longer sides Y1 are substantially parallel to each other. The shorter side X2 of the rectangular column structure 11 is substantially parallel to the shorter side X1 of the unit lattice L, and the longer side Y2 is parallel to the longer side Y1 of the unit lattice L.

The ratio between the length x2 of the shorter side X2 and the length y2 of the longer side Y2 of the rectangular column structure 11 shown in FIG. 3 is set to x1:x2:y2=1:0.133:0.48 to 1:0.158:0.58.

As shown in FIG. 3A, a line segment Lx linking centers of two rectangular column structures 11 adjoining in an X direction and a line segment Ly linking centers of two rectangular column structures 11 adjoining in a Y direction are substantially orthogonal to each other substantially at their midpoints. The ratio between the length of the line segment Lx and the length of the line segment Ly is 1:substantially $\sqrt{3}$.

The center of the rectangular column structure 11 disposed on the shorter side X1 substantially coincides with the midpoint of the shorter side X1, and the center of the rectangular column structure 11 disposed on the longer side Y1 substantially coincides with the midpoint of the longer side Y1.

The center of the rectangular column structure 11 is the center in a direction along the plane.

In the present invention, the above ratio is adopted based on a full band gap width determined from a simulation (described in detail later).

Figure 5:
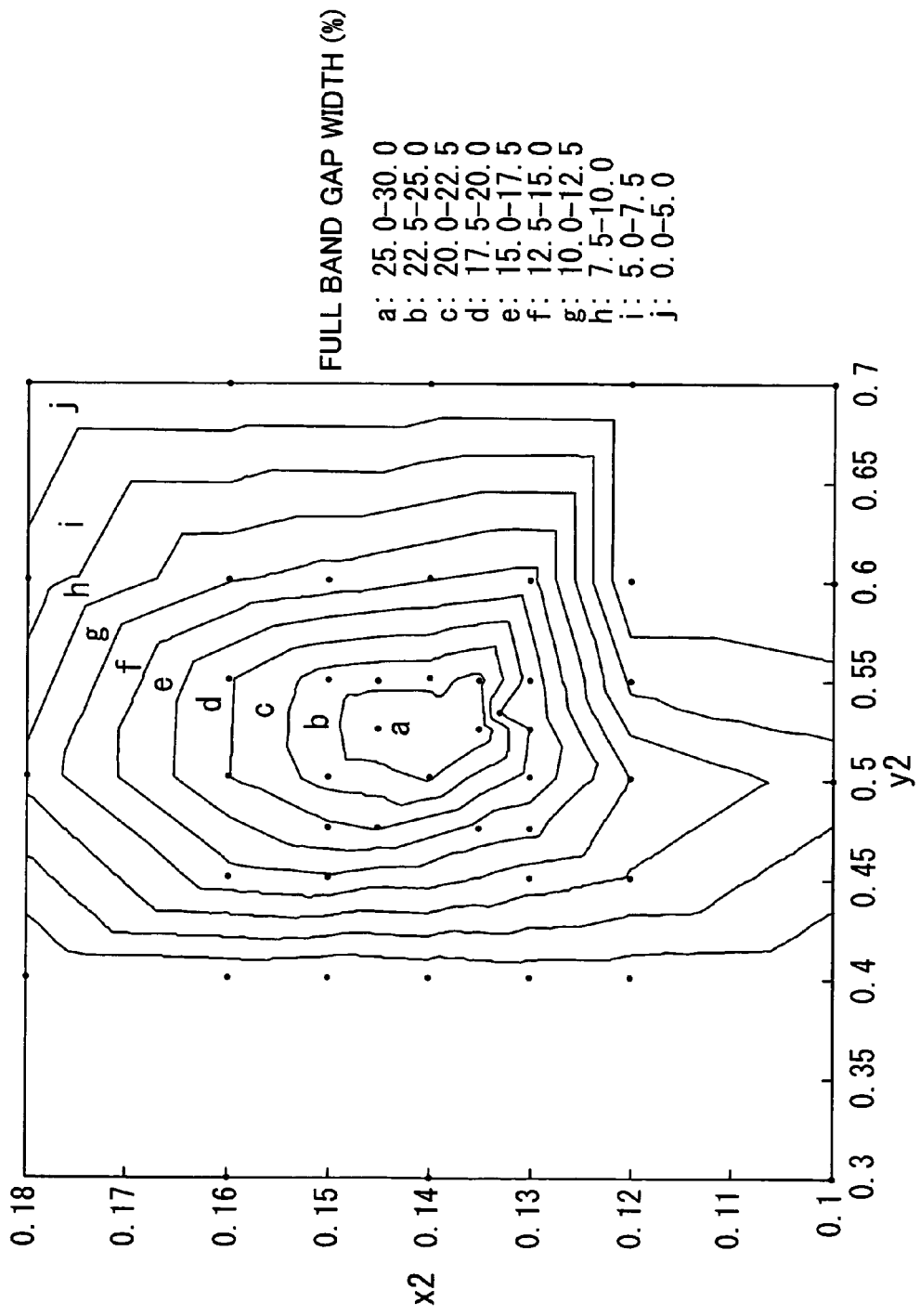
FIG. 5 is a scatter diagram showing a full band gap width obtained from a simulation.

FIG. 5 shows the result of the simulation of the full band gap width where the ratio of x1:y1 is fixed to 1:$\sqrt{3}$, and x2 and y2 are varied. As shown in FIG. 5, a broad full band gap can be obtained by selecting x2 and y2.

Figure 6:
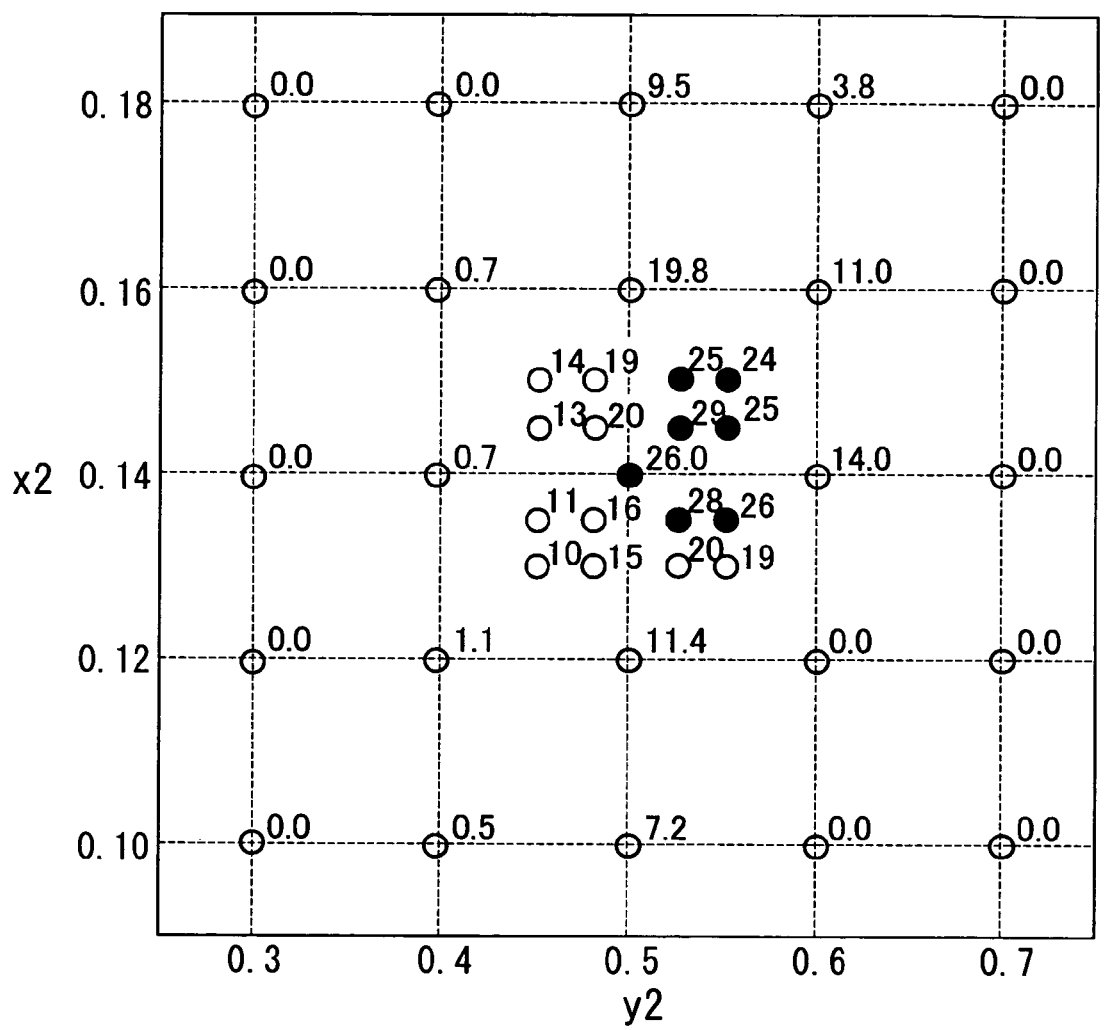
FIG. 6 is a scatter diagram showing the full band gap width obtained from a simulation.

FIG. 6 shows vales of full band gaps in given vales of x2 and y2.

In FIG. 6, plots in which broad full band gap widths of 22.5% or greater are obtained are filled in with black. Black plots are included in the range of x1:x2:y2=1:0.133:0.48 to 1:0.158:0.58. In the range of 1:0.133:0.48 to 1:0.148:0.53, a full band gap width of 26% or greater can be obtained. In the range of 1:0.133:0.52 to 1:0.148:0.53, a full band gap width of 28% or greater can be obtained.

The outline of a method for calculating a full band gap by the simulation described above will now be described.

For calculation, "Translight" which is a transmission property simulator for photonic crystals was used. This software was developed by Mr. Andrew Reynolds when he belonged to Glasgow University. As a calculation method, the transfer matrix method is used. In this software, circular columns and rectangular columns are freely disposed, and reflection and transmission properties are calculated when the TE wave and the TM wave enter a photonic crystal structure which is an aggregate of the columns. The incidence of the waves may be at any angle of 0 to 90°, and a solution can be obtained for any frequency range.

The shape of a photonic crystal structure to be calculated, the frequency region, the range of angles of incidence of the TE wave and the TM wave, and the dielectric constant of a dielectric material to be used were entered into the simulator. The angles of incidence are 0 to 90°. The calculated photonic crystal structure is symmetrical with respect to the x-y (should be matched with the x-y in FIG. 3) plane, and therefore incidence of all electromagnetic waves incident from the y-z (should be matched with the x-y in FIG. 3) plane at this angle are covered. By calculating (simulating) this, reflection and transmission losses for frequencies were obtained at angles of incidence of the TE wave and the TM wave. It was recognized that a band gap was generated when the transmission loss was 50 dB or greater. Angles of incidence and frequencies for which the transmission loss was 50 dB or greater were extracted for the TE wave and the TM wave. When the band gap is generated for all angles of incidence of the TE wave and the TM wave for a certain frequency, a full band gap is formed at this frequency. Existence/nonexistence of the full band gap was checked for each frequency. If the full band gap continuously existed for frequencies, a value obtained by dividing the frequency width by the mean frequency of the frequency width was determined to be a full band gap width (%). The full band gap width being plotted against the shape of the photonic crystal (values of x2 and y2 of the rectangular column structure 11) is shown in FIGS. 5 and 6.

A suitable method for producing the photonic crystal will now be described using FIGS. 7 and 8.

In this production method, the slurry-based 3DP (three dimensional printing) process developed by Massachusetts Institute of Technology) is used. The basic procedure of this 3DP process is shown in FIG. 7. This process may be applied to any material as long as it can be formed into a slurry, and selection of materials is not limited. For example, plastics such as acryl and polycarbonate, metals such as Al, Cu and Ag and semiconductors such as Si and GaAs as well as ceramics such as alumina ($Al_2O_3$), silicon carbide (SiC), barium titanate ($BaTiO_3$), lead zirconate titanate (PLT) and BaO—$Nd_2O_3$—$TiO_2$ may be used.

Figure 7:
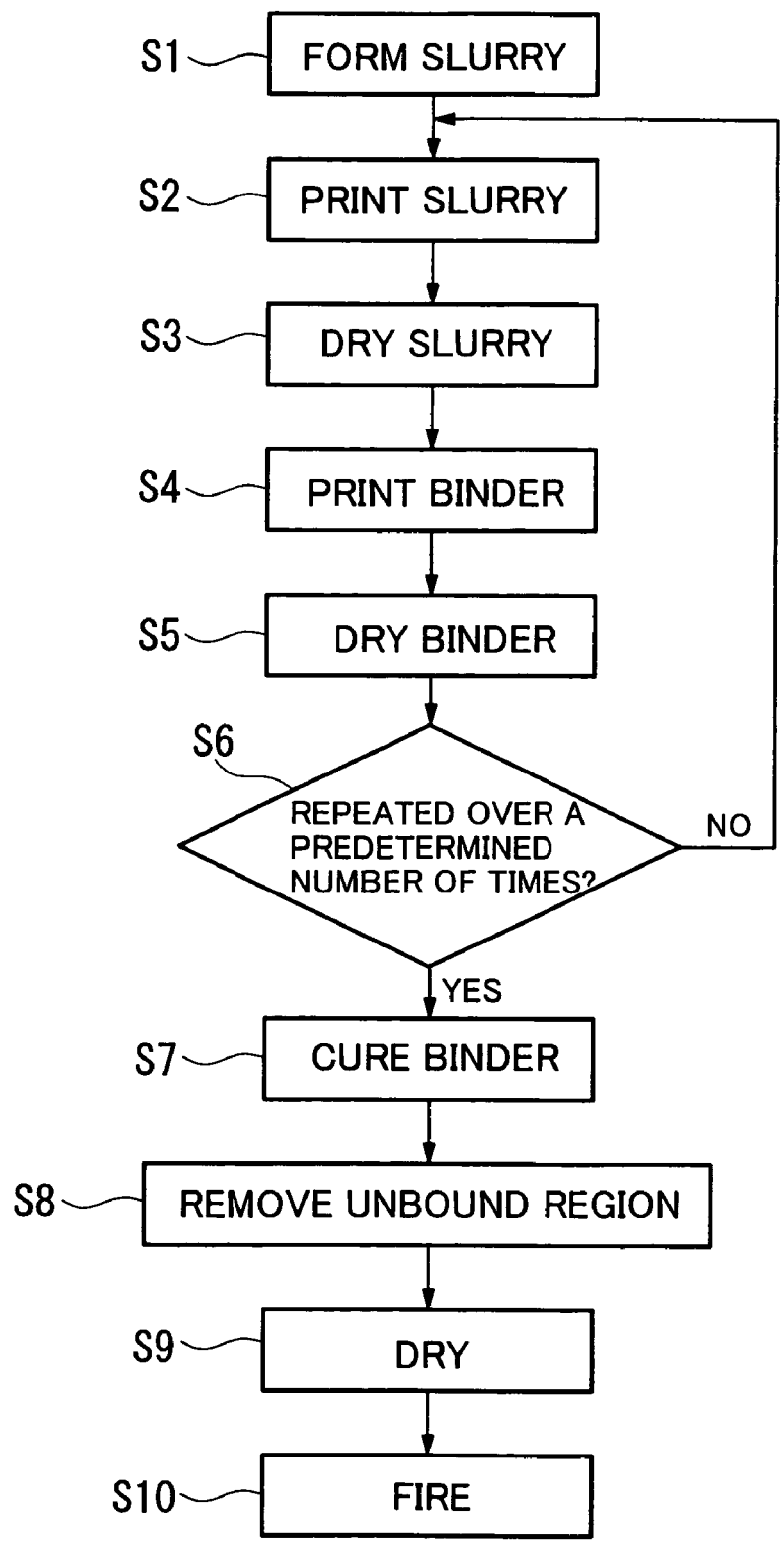
FIG. 7 is a flowchart showing a production method suitable for the photonic crystal according to the present invention.

In the 3DP process, as shown in FIG. 7, a dielectric powder constituting the rectangular column structure 11 and the base 12 is first dispersed in a solvent to form a slurry in a slurry forming step S1. For the solvent, an organic solvent such as alcohol may be used, but the solvent is preferably based on water because of non-toxicity, easy handling and less influence on the dielectric powder. A dispersant and the like are added to the solvent as required. Two or more types of dielectric powder may be used to fabricate the rectangular column structure 11 and the base 12.

Then, in a slurry printing step S2, one layer of a slurry including the dielectric powder is print-formed on the surface of a base using a jet print process. The thickness of the dielectric layer which is printed is determined in consideration of a factor of shrinkage in a drying step or the like.

In a subsequent slurry drying step S3, the solvent is dried away from the dielectric layer print-formed in the slurry printing step S2. A method of drying may be either natural drying or heat drying.

Then, in a binder printing step S4, a binder is print-coated on predetermined areas of the dielectric layer already formed by the jet print process. The binder is coated on areas constituting the rectangular column structure 11 and the base 12. The amount of binder discharged is adjusted so that the binder permeates one layer of the dielectric layer.

The type of binder for use in the binder printing step S4 is not specifically limited, but a water-soluble binder having water as a solvent is preferable because of easy handling, less influence on the dielectric powder and non-toxicity. For redispersing in water powder which is not cured by the binder and removing the powder from the molded body of dielectric material (step S8), the binder should be water-insoluble after curing. Further, if considering the mechanical strength after curing, as the binder, a thermoset resin is preferably used, and polyacrylic acid (PAA) is especially preferable.

Then, in a binder drying step S5, a solvent included in the binder permeating the dielectric layer is dried away. A method of drying may either natural drying or heat drying. In the dielectric layer which has undergone the binder drying step S5, the dielectric powder existing in a region permeated with the binder is bound together by the binder.

The steps from the slurry printing step S2 to the binder drying step S5 are repeated over a predetermined number of times (FIG. 7, determination step S6). As a result, a block molded body in which a region where the dielectric powder is bound together by the binder (bound region) and other region (unbound region) coexist is formed. As described specifically later, the bounded region forms the rectangular column structure 11 constituting the first dielectric region, and the unbound region forms the air gap 13 constituting the second dielectric region. The binder is printed in the binder printing step S4 so that the bound region and the unbound region are periodically disposed as shown in FIGS. 2 and 3 as plan views.

After the steps described above are repeated over a predetermined number of times, processing proceeds to a binder curing step S7.

In the binder curing step S7, a molded body obtained by printing a predetermined number of layers by repeating the steps described above is subjected to a heat treatment and the like to sufficiently cure the binder permeating the dielectric layer in the binder printing step S4. Through this process, the dielectric powder is strongly bound together by the cured binder, and therefore the strength of binding of the dielectric powder increases, thus extremely easing subsequent handling.

After the binder curing step S7, an unbound region removing step S8 is carried out.

In the unbound region removing step 8, the dielectric powder existing in the unbound region is removed from the molded body. The powder can be removed by immersing in water the molded body composed of the stacked dielectric layer. Specifically, the dielectric powder which is not bound by the binder is immersed in water, whereby it is removed from the dielectric layer and redispersed in water.

A dispersant is preferably added in the slurry in a slurry forming step S1 so that the dielectric powder which is not bound by binder is easily redispersed in water in the removing step (step S8). For the dispersant, for example, polyethylene glycol (PEG) may be used. It is effective that ultrasonic waves are applied to water in which the molded body is immersed, or the molded body itself when the dielectric powder is redispersed.

After the removing step (step S8) is completed, the molded body with the dielectric powder bound together by the binder into the shape of the rectangular column structure 11 is drawn up from water, and a drying step S9 is carried out. For this drying step S9, either natural drying or heat drying may be carried out.

The molded body which has undergone the drying step S9 may be used directly as the photonic crystal 1, but may also be fired into a fired body in a firing step S10. By firing the molded body into the fired body, the mechanical strength and the dielectric constant are further improved.

The unbound region removing step S8 is carried out after the binder curing step S7 in the above description. However, depending on the density of the dielectric powder in the region permeated with the binder, the properties of the binder used, and the like, it is also possible to omit the binder curing step S7 and carry out the unbound region removing step S8. The present invention also includes this aspect.

The steps of the method for producing the photonic crystal 1 described above will now be described more specifically with reference to FIG. 8.

Figure 8A:
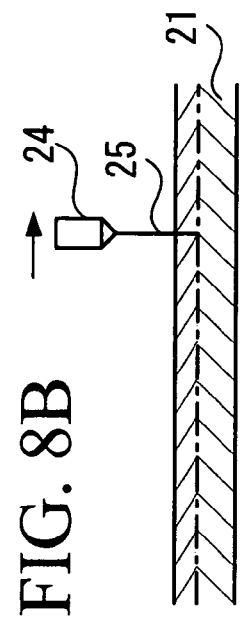
FIG. 8 is a view showing predetermined steps of the production method suitable for the photonic crystal according to the present invention.

FIG. 8A schematically shows a situation in which a slurry 23 including a dielectric powder is discharged from a jet print head 22 to form a first dielectric layer on a substrate 21 in the slurry printing step S2.

The slurry 23 including the dielectric powder is continuously discharged while the jet print head 22 for discharging the slurry is two-dimensionally scanned, whereby one layer of the slurry 23 is print-formed on a surface of the substrate 21. The substrate 21 may be moved while the jet print head 22 is fixed.

If the substrate 21 is porous, a solvent in the printed dielectric layer is absorbed into the substrate 21 to increase the compactness of the dielectric powder and hence increase the molding density of the dielectric powder. For this purpose, fired alumina may be used as the substrate 21. The molded body itself composed of the dielectric powder forming the slurry 23 may be used as the substrate 21.

When the solvent included in the slurry 23 is dried away in the drying step S3, one layer of the dielectric layer is formed.

Figure 8B:
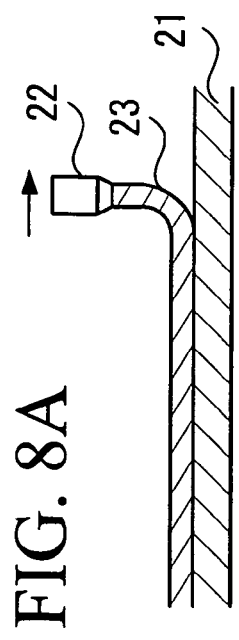

After the first dielectric layer is formed, the binder printing step S4 is carried out as shown in FIG. 8B.

FIG. 8B schematically shows a situation in which a binder 25 is discharged from a jet print head 24 and print-coated on only a predetermined area in the binder printing step S4.

The binder 25 is continuously discharged while the jet print head 24 for discharging the binder is scanned, whereby the binder 25 is made to permeate the entire surface of the print-formed dielectric layer. In FIG. 8, shading (gradation) is applied to regions permeated with the binder 25. The amount of the binder 25 discharged from the jet print head 24 is controlled so that the binder 25 sufficiently permeates the entire area of the dielectric layer. After the binder 25 is print-coated, the binder drying step S5 of drying away the binder 25 is carried out.

Figure 8C:
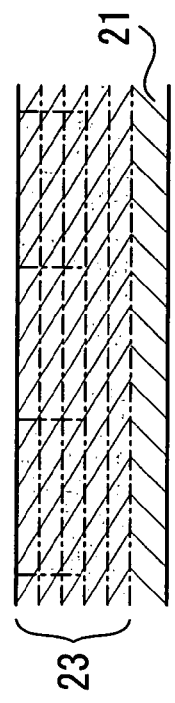

After the binder drying step S5 for the first dielectric layer is carried out, the second layer of the slurry 23 is printed, the binder 25 is printed/dried for the second dielectric layer, and the third layer of the slurry 23 is printed in the same manner as described above. After the third layer of the slurry 23 is printed and the solvent included in the slurry 23 is removed, the binder 25 is printed. FIG. 8C shows this. In FIG. 8C, the binder 25 is intermittently discharged while the jet print head 24 is scanned. In FIG. 8C, the discharge of the binder 25 is stopped in areas corresponding to void regions in the dielectric layer to which hatching is applied. The void regions are regions which are not permeated with the binder 25.

Up to the fifth dielectric layer, the binder 25 is intermittently printed in the same manner as in FIG. 8C. A molded body thus obtained is shown in FIG. 8D.

Figure 8D:
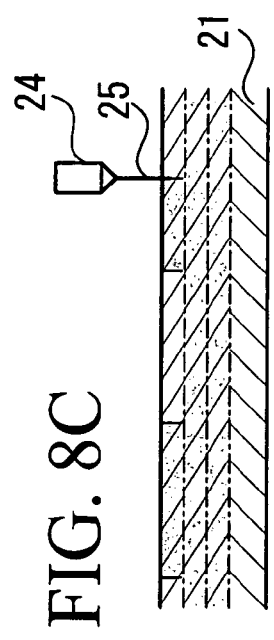

In this molded body, regions having the binder 25 and regions having no binder 25 are periodically disposed as shown in FIG. 8D. The molded body shown in FIG. 8D is then subjected to the binder curing step S7. In this step, a heat treatment is carried out for curing the binder 25 which has permeated the molded body.

Figure 8E:
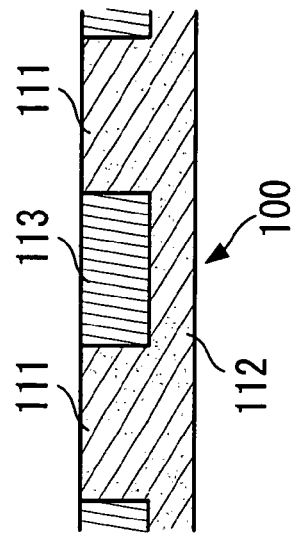

FIG. 8E schematically shows a state in which the dielectric powder existing in the region which is not cured by the binder 25 (unbound region described above) is removed from the molded body shown in FIG. 8D. The molded body which has undergone the binder curing step S7 is removed from the substrate 21, and immersed in water. By so doing, the dielectric powder existing in the unbound region of the molded body is redispersed in water and thus removed. An area deprived of the dielectric powder becomes the air gap 13 in which air exists. At this time, it is effective to apply an ultrasonic wave. Because the area deprived of the dielectric powder becomes the air gap 13, this molded body constitutes the photonic crystal 1 in which the rectangular column structure 11 having the dielectric powder and the air gap 13 composed of air are periodically disposed. This structure may be fired as described above.

The molded body shown in FIG. 8E is the photonic crystal 1 using air as the second dielectric region, but the photonic crystal 1 using a dielectric material other than air as the second dielectric region may be fabricated.

Figure 8F:
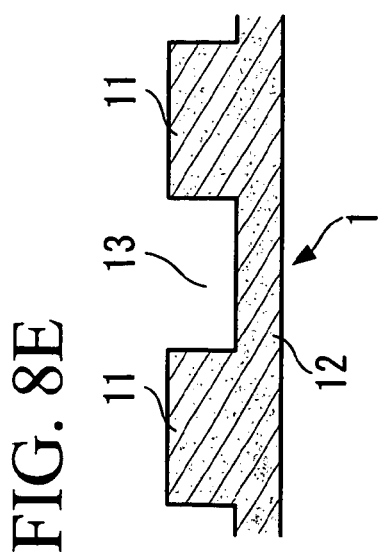

FIG. 8F shows a photonic crystal obtained by fabricating a molded body or fired body shown in FIG. 8E by the method described above, and then filling an air gap 113a thereof with a dielectric material different from a rectangular column structure 111. A difference in dielectric constant between the first dielectric region and the second dielectric region may be determined according to properties of a desired photonic crystal 100.

FIG. 8 shows a side cross section of the photonic crystal 1 (100), but if it is viewed plain-wise, the jet print head 24 is scanned so that the rectangular column structure 11 is disposed as shown in FIG. 3. At this time, the binder 25 is printed on an area in which the rectangular column structure 11 (111) is formed.

The method for obtaining the photonic crystals 1, 100 of the present invention by the 3DP process has been described above, but the photonic crystal may be obtained by well known methods such as a dry etching method, a self-cloning method and a stereo lithography method. Each method will be briefly described.

The dry etching method is a method in which a material is etched into a desired shape by an etching gas using a mask fabricated by a photolithography technique. The self-cloning method is a method in which bias sputtering is carried out in a specific mode, whereby a material is deposited in a direction perpendicular to a base while maintaining periodicity of irregularities on the base. The stereo lithography method is a method in which a liquid photo-curable resin is irradiated with an ultraviolet beam, and only an irradiated region is made to undergo a polymerization reaction to cure the photo-curable resin into a desired shape.

In addition, the configurations described in the above embodiments can be selectively adopted and rejected, or changed to other configurations as appropriate within the sprit of the present invention as a matter of course. For example, an optical resonator can be obtained by forming a defect region confined in a crystal, and a waveguide can be obtained by forming a linear defect within the crystal.

INDUSTRIAL APPLICABILITY

According to the present invention, a photonic crystal which is easily produced and has a two-dimensional periodic structure capable of having a complete band gap for a TE wave and a TM wave.

The invention claimed is:

1. A two-dimensional photonic crystal, wherein on a plane in which four adjoining unit lattices are arranged so as to have one angle in common with the unit lattice being a rectangle whose shorter side X1 has a length of x1 and whose longer side Y1 has a length of y1, first dielectric regions each being columnar and having a rectangular cross section whose shorter side X2 has a length of x2 and whose longer side Y2 has a length of y2 are disposed on said shorter sides X1 and said longer sides Y1 of each rectangular unit lattice, characterized in that said first dielectric region is arranged so that the midpoint of said shorter side X1 and the midpoint of said longer side Y1 and the center of said rectangular cross section substantially coincide, said longer sides Y2 of each said first dielectric region are substantially parallel to each other, the ratio of x1:y1 equals 1:substantially $\sqrt{3}$, and the ratio of x1:x2:y2 equals 1:0.133:0.48 to 1:0.158:0.58; and wherein:

said two dimensional-photonic crystal has a full band gap width of 22.5% or greater.

2. A two-dimensional photonic crystal, wherein on a plane in which four adjoining unit lattices are arranged so as to have one angle in common with the unit lattice being a rectangle whose shorter side X1 has a length of x1 and whose longer side Y1 has a length of y1, first dielectric regions each being columnar and having a rectangular cross section whose shorter side X2 has a length of x2 and whose longer side Y2 has a length of y2 are disposed on said shorter sides X1 and said longer sides Y1 of each rectangular unit lattice, characterized in that said first dielectric region is arranged so that the midpoint of said shorter side X1 and the midpoint of said longer side Y1 and the center of said rectangular cross section substantially coincide, said longer sides Y2 of each said first dielectric region are substantially parallel to each other, the ratio of x1:y1 equals 1:substantially $\sqrt{3}$, and the ratio of x1:x2:y2 equals 1:0.133:0.48 to 1:0.158:0.58; wherein:

said photonic crystal comprises a second dielectric region surrounding said first dielectric region and having a dielectric constant different from that of said first dielectric region, one of said first dielectric region and said second dielectric region is formed from a dielectric material, and the other is formed from a gas, and;

said dielectric material is a $BaO-TiO_2$ based dielectric material or $BaO-Nd_2O_3-TiO_2$ based dielectric material.

3. A two-dimensional photonic crystal in which first dielectric regions and second dielectric regions having a dielectric constant different from that of said first dielectric region are periodically disposed, characterized in that the two-dimensional photonic crystal comprises:

said first dielectric regions each being columnar and having a rectangular cross section; and said second dielectric regions each surrounding said first dielectric region, a line segment Lx linking centers of two of said first dielectric regions adjoining in an X direction and a line segment Ly linking centers of two of said first dielectric regions adjoining in a Y direction orthogonal to said X direction are substantially orthogonal to each other substantially at their midpoints, the ratio between the length x3 of said line segment Lx and the length y3 of said line segment Ly equals 1:substantially $\sqrt{3}$, and the ratio between the length x3 of said line segment Lx and the length x2 of said first dielectric region in said X direction and the length y2 in said Y direction equals 1:0.133:0.48 to 1:0.158:0.58; and wherein:

one of said first dielectric region and said second dielectric region is formed from a dielectric material, and the other is formed from a gas, and;

said dielectric material is a $BaO-TiO_2$ based dielectric material or $BaO-Nd_2O_3-TiO_2$ based dielectric material.

4. The two-dimensional photonic crystal according to claim 1 or 2, characterized in that said first dielectric region is arranged so that said longer side Y2 of the rectangular cross section is substantially parallel to said longer side Y1 of the unit lattice.

5. The two-dimensional photonic crystal according to claim 1 or 2, characterized in that the ratio of x1:x2:y2 equals 1:0.135:0.48 to 1:0.150:0.54.

6. The two-dimensional photonic crystal according to claim 1 or 2, characterized in that the ratio of x1:x2:y2 equals 1:0.135:0.52 to 1:0.140:0.54.

7. The two-dimensional photonic crystal according to claim 1 or 2, characterized in that the size of said rectangular cross section is 0.10 μm×0.37 μm, or greater.

8. The two-dimensional photonic crystal according to claim 1, characterized in that said photonic crystal comprises a second dielectric region surrounding said first dielectric region and having a dielectric constant different from that of said first dielectric region, one of said first dielectric region and said second dielectric region is formed from a dielectric material, and the other is formed from a gas.

9. The two-dimensional photonic crystal according to claim 8, characterized in that said dielectric material is a BaO—$TiO_2$ based dielectric material or BaO—$Nd_2O_3$—$TiO_2$ based dielectric material.

10. The two-dimensional photonic crystal according to claim 8 or 2, characterized by comprising a flat-plate shaped base, and a plurality of said first dielectric regions formed from a dielectric material the same as that of said base and erected from said base.

11. The two-dimensional photonic crystal according to claim 1 or 2, characterized in that said photonic crystal comprises a second dielectric region surrounding said first dielectric region and having a dielectric constant different from that of said first dielectric region, and said first dielectric region and said second dielectric region are formed from dielectric materials having different dielectric constants.

12. The two-dimensional photonic crystal according to claim 11, characterized in that said first dielectric region and said second dielectric region are fired bodies.

13. The two-dimensional photonic crystal according to claim 11, characterized by comprising a flat-plate shaped base, a plurality of said first dielectric regions erected from said base and formed from a dielectric material the same as that of said base, and a second dielectric region surrounding said first dielectric region.

14. A two-dimensional photonic crystal in which first dielectric regions and second dielectric regions having a dielectric constant different from that of said first dielectric region are periodically disposed,
  characterized in that the two-dimensional photonic crystal comprises:
  said first dielectric regions each being columnar and having a rectangular cross section; and
  said second dielectric regions each surrounding said first dielectric region,
  a line segment Lx linking centers of two of said first dielectric regions adjoining in an X direction and a line segment Ly linking centers of two of said first dielectric regions adjoining in a Y direction orthogonal to said X direction are substantially orthogonal to each other substantially at their midpoints,
  the ratio between the length x3 of said line segment Lx and the length y3 of said line segment Ly equals 1:substantially $\sqrt{3}$, and the ratio between the length x3 of said line segment Lx and the length x2 of said first dielectric region in said X direction and the length y2 in said Y direction equals 1:0.133:0.48 to 1:0.158:0.58; and wherein:
  said two dimensional-photonic crystal has a full band pap width of 22.5% or greater.

15. The two-dimensional photonic crystal according to claim 14 or 3, characterized in that the ratio of x3:x2:y2 equals 1:0.135:0.48 to 1:0.150:0.54.

16. The two-dimensional photonic crystal according to claim 14 or 3, characterized in that the ratio of x3:x2:y2 equals 1:0.135:0.52 to 1:0.140:0.54.

17. The two-dimensional photonic crystal according to claim 14, characterized in that one of said first dielectric region and said second dielectric region is formed from a dielectric material, and the other is formed from a gas.

18. The two-dimensional photonic crystal according to claim 14 or 3, characterized in that said first dielectric region and said second dielectric region are formed from dielectric materials having different dielectric constants.

19. The two-dimensional photonic crystal according to claim 2 or 3, characterized in that said two dimensional-photonic crystal has a full band gap width of 22.5% or greater.

* * * * *